United States Patent [19]

Baker et al.

[11] 4,101,678
[45] Jul. 18, 1978

[54] CLARIFICATION OF CITRUS JUICES

[75] Inventors: Robert A. Baker, Winter Haven; Joseph H. Bruemmer, Tampa, both of Fla.

[73] Assignee: The United States of America as represented by the Secretary of Agriculture, Washington, D.C.

[21] Appl. No.: 794,597

[22] Filed: May 6, 1977

[51] Int. Cl.$^2$ ............................................... A23L 2/30
[52] U.S. Cl. .................................. 426/50; 426/330.5; 426/422; 426/51
[58] Field of Search ................ 426/49, 51, 330.5, 422, 426/599, 330, 50

[56] References Cited

U.S. PATENT DOCUMENTS

| | | | |
|---|---|---|---|
| 3,754,932 | 8/1973 | Baker et al. | 426/330.5 X |
| 3,917,867 | 11/1975 | Atkins et al. | 426/599 X |

OTHER PUBLICATIONS

Chemical Abstracts, vol. 75, 137092z; 1971.
Chemical Abstracts, vol. 72, 208k; 1970.
Chemical Abstracts, vol. 85, 158108f; 1976.

*Primary Examiner*—Raymond N. Jones
*Assistant Examiner*—Robert J. Warden
*Attorney, Agent, or Firm*—M. Howard Silverstein; David G. McConnell; Salvador J. Cangemi

[57] ABSTRACT

A process for the clarification of citrus juices is disclosed. Polygalacturonic acid is added to cloudy citrus juice. The resultant coagulated material is removed from solution leaving a clear liquid.

10 Claims, No Drawings

CLARIFICATION OF CITRUS JUICES

BACKGROUND OF THE INVENTION

1. Field of the Invention

This invention relates to the clarification of citrus juices.

2. Description of the Prior Art

All citrus juices contain, when freshly expressed, a dense suspension of insoluble colloidal particulates commonly referred to as "cloud". While this cloud is generally desirable, there are products, such as lime juice, which are sold predominately as a clear juice. Florida lime juice production is dependent upon natural clarification to remove cloud. Freshly extracted juice, treated with sodium bisulfite to retard spoilage, is held for 30 days in large tanks to allow natural clarification. The juice may or may not reach the desired level of clarity in the allotted time. Clarified supernatant is drawn off from the settled cloud, centrifuged, treated with filter aid, and filtered in a cloth press to yield a sparkling clear juice. Settled materials in the clarification tank, which occupy 25-30% of the tank volume, cannot be economically removed from the suspending liquid and this fraction is therefore discarded.

SUMMARY AND OBJECT OF THE INVENTION

This invention is a new process whereby cloud of citrus juice is caused to coagulate, rendering it easily removable. The process comprises adding a sufficient amount of polygalacturonic acid (PGA) to juice to eliminate cloud, allowing the solution to stand to coagulate, and removing the said coagulated material leaving a clear liquid.

The present invention eliminates the following conventional expedients: (1) the extended storage time required for natural clarification; (2) use of sodium bisulfite additive since the juice is not stored; (3) unpredictability of natural clarification; (4) use of filter aid and filter press, and (5) loss of a large fraction of juice from the settling tank.

It is the principal object of this invention to clarify citrus juices.

It is another object of this invention to produce a coagulant suspended in juice which can be removed from the solution.

It is another object of this invention to remove constituents of citrus juice commonly known as "cloud".

It is another object of this invention to improve the marketability of citrus juice.

It is another object of this invention to produce an economical process for the clarification of citrus juices.

Other objects and advantages of the invention will become obvious from the detailed description of the invention outlined infra.

DETAILED DESCRIPTION OF INVENTION

Three examples are given infra to demonstrate the scope of the work and outline the parameters for which the instant invention was deliniated. Although the process was developed for any citrus juice, the instant invention was demonstrated on the more common juices (lime, orange, grapefruit).

In the practice of the present invention, PGA is added to citrus juice preferably in amounts to produce about 50 to 500 ppm PGA concentration in solution. After the addition of PGA, the mixture is left standing until formation of clear solution and coagulated cloud, which usually requires about 5 minutes to 1 hour holding time. Thereafter, the clear liquid is separated from the coagulated cloud by conventional techniques such as settling or centrifugation.

The clear solution may be concentrated and recombined with the coagulated cloud material in the prior art manner. However, first it is necessary to treat the coagulated cloud with water to form a slurry and then adjusting the pH of the slurry to about 2.8 to 5.0. Pectinase of about 0.05 to 0.2 percent by weight is added to the slurry to destroy the PGA and restore the colloidal stability of the cloud; and the slurry is treated with 0.1 to 0.5 percent by weight Kumitanase to eliminate any bitterness. The resultant slurry is then added back to the clear concentrated solution.

The following examples are given to more specifically demonstrate the working of the instant invention.

EXAMPLE 1

A 1% solution of polygalacturonic acid (hereinafter referred to as PGA) was obtained by suspending 10 g of powdered PGA in 700 ml of water, adjusting the solution pH to 5.5 with potassium hydroxide to dissolve the PGA, and diluting said solution to 1 liter with water. Fifty ml of this solution was mixed with 5 liters of cloudy unpasteurized lime juice, giving a final concentration of 100 parts per million of PGA in the juice. Juice was held for 45 minutes and then centrifuged for 10 minutes at 340 $\times$ g. After centrifugation, the light transmission in percent of an untreated sample of juice was 47.0, while that of PGA treated juice was 94.0. In another trial, this same level of PGA increased light transmission of juice from 56.2% to 97.6% within one hour.

EXAMPLE 2

Two liters of fresh unpasteurized orange juice was treated with 20 ml of the PGA Solution described in Example 1. After 30 minutes the juice was centrifuged to remove all cloudy constituents, and the clear serum was concentrated on a rotary vacuum evaporator. Coagulated cloud removed by centrifugation was slurried with a small volume of water and adjusted to pH 4.5 with sodium hydroxide. This suspension was treated with 0.1% by weight of a pectinase having high polygalacturonase activity to destroy the PGA. Colloidal stability of the cloud was thus restored and when added back to the concentrated serum or used as a clouding agent for some other beverage it had all the desirable attributes of fresh cloud.

EXAMPLE 3

Twenty ml of the PGA solution described in Example 1 was mixed with two liters of freshly extracted grapefruit juice having an unacceptably high level of bitter glucoside naringin (above 350 ppm or a Davis Value greater than 750 ppm). Cloud and pulp were removed by centrifugation and slurried with a small quantity of water and 0.2% by weight of Kumitanase, a commercial naringinase preparation. This slurry was then adjusted to pH 4.5 with sodium hydroxide, mixed with 0.1% by weight of a pectinase in sufficient quantity capable of degrading PGA and stirred for 2 hours. Time periods of 1 to 3 hours are acceptable. Colloidal stability of the cloud was restored by pectinase destruction of PGA, and naringinase treatment substantially reduced bitterness. Resuspension of this cloud in the original serum gave a juice of naringin level below 350 ppm with the use of 80% less naringinase than would have been required to debitter whole juice.

MODIFICATIONS WHICH CAN BE EMPLOYED

In addition to its use in lime juice, this invention would find application in any process which has as its object the production of citrus juice concentrate, beverage base concentrate, or powdered juice in which pulp and cloud is removed, or where the clear serum is concentrated and recombined with the cloud. This invention would permit rapid and economic separation of cloud from the suspending serum and its resuspension at a later time.

PGA concentration in the additive solution is not critical, nor is the pH to which it is adjusted, providing this pH is high enough for PGA to be solubilized. Bases other than potassium hydroxide, such as sodium hydroxide, may be used to adjust the pH of the PGA solution pH of 4.0 to 5.0 is acceptable for the instant invention. Concentrations of PGA added to juice and holding time before centrifugation are variables as given by the maximum and minimum parameters in the examples, and which may be adjusted to compensate for varying juice cloud densities, available storage capacity, and degree of clarity desired.

Centrifugation times and g forces given are for illustrative purposes only, as any combination of time and centrifugal force adequate to clear the serum to the required degree would suffice.

Any enzyme preparation which will hydrolyze or otherwise destroy the PGA in the coagulum, thus restoring colloidal stability of the cloud, may be used.

We claim:

1. A process for the clarification of citrus juices by the removal of cloud, comprising in combination the following:
   (a) adding a sufficient amount of polygalacturonic acid (PGA) to citrus juice;
   (b) allowing said solution to stand and cloud material to coagulate;
   (c) removing the resultant coagulated cloud material thereby leaving a clear solution.

2. The process as defined in claim 1 wherein the resultant solution of PGA in citrus juice is about 50 to 500 ppm PGA.

3. The process as defined in claim 1 wherein the citrus juice is lime, orange or grapefruit.

4. The process as defined in claim 1 wherein the solution is allowed to stand for about 5 minutes to 1 hour to coagulate and the means of removing the coagulated material from the solution is by settling or centrifugation.

5. The process as defined in claim 1 further comprising:
   (a) concentrating the clear resultant solution;
   (b) adding water to said removed coagulated material to form a slurry;
   (c) adjusting the pH of said slurry to about 4.0 to 5.0;
   (d) adding pectinase to said slurry to destroy the (PGA) and restore the colloidal stability of the cloud; and then
   (e) adding said slurry back to the concentrated solution produced in step (a).

6. The process as defined in claim 5 wherein the pectinase is about 0.05 to 0.2% by weight and has a high polygalacturonase activity.

7. The process as defined in claim 1 further comprising:
   (a) adding water to any pulp which may be present and to said coagulated material to thus form a slurry;
   (b) adding a sufficient quantity of Kumitanase to said slurry;
   (c) adjusting the pH of said slurry using a base to solubilize the PGA;
   (d) adding pectinase to said slurry to destroy the PGA;
   (e) stirring said slurry for sufficient time to restore the colloidal stability of the cloud and resulting in pectinase destruction of PGA, and Kumitanase treatment substantially reducing the bitterness.

8. The process as defined in claim 7 wherein the Kumitanase is about 0.1 to 0.5% by weight.

9. The process as defined in claim 7 wherein the pectinase is about 0.05 to 0.2% by weight and has substantial polygalacturonase activity.

10. The process as defined in claim 9 wherein the holding time is about 1 hour to 3 hours.

* * * * *